(12) United States Patent
Parmentola et al.

(10) Patent No.: US 10,279,883 B2
(45) Date of Patent: May 7, 2019

(54) SYSTEMS AND METHODS FOR LIGHTER-THAN-AIR HIGH ALTITUDE PLATFORMS

(71) Applicant: General Atomics, San Diego, CA (US)

(72) Inventors: John Abele Parmentola, San Diego, CA (US); John Marshall Rawls, Del Mar, CA (US); Alberto Alvarez-Calderon F., La Jolla, CA (US); Brian Maskew, Winthrop, WA (US)

(73) Assignee: General Atomics, San Diego, CA (US)

( * ) Notice: Subject to any disclaimer, the term of this patent is extended or adjusted under 35 U.S.C. 154(b) by 296 days.

(21) Appl. No.: 15/157,132

(22) Filed: May 17, 2016

(65) Prior Publication Data
US 2017/0334538 A1    Nov. 23, 2017

(51) Int. Cl.
*B64B 1/26*    (2006.01)
*B64B 1/08*    (2006.01)

(52) U.S. Cl.
CPC . *B64B 1/26* (2013.01); *B64B 1/08* (2013.01)

(58) Field of Classification Search
CPC .... B64B 1/08; B64B 1/58; B64B 1/20; B64B 1/06; B64B 1/26; B64B 2201/00; B64B 1/10; B64B 1/30; B64B 1/02; B64B 1/12; B64B 1/00; B64B 1/40; A61B 17/1325; A61B 17/00; B64C 39/00; B64C 11/00
See application file for complete search history.

(56) References Cited

U.S. PATENT DOCUMENTS

| 712,689 A | 11/1902 | Krocker |
| 725,981 A | 4/1903 | Michelsen |
| 849,029 A | 4/1907 | Taylor |
| 982,561 A | 1/1911 | Anway |
| 1,020,484 A | 3/1912 | Dusterloh |

(Continued)

FOREIGN PATENT DOCUMENTS

| WO | WO01/72588 | * 10/2001 | ............... B64B 1/26 |
| WO | WO 01/72588 | 10/2001 | |

OTHER PUBLICATIONS

WO1/72588 Discription English Translation (see attched).*

(Continued)

*Primary Examiner* — Assres H Woldemaryam
(74) *Attorney, Agent, or Firm* — Knobbe Martens Olson & Bear LLP

(57) ABSTRACT

An energy efficient and lighter-than-air high altitude platform (HAP) is disclosed that allows for sustained station keeping at high altitudes of about 50,000-80,000 feet for prolonged periods of time. The HAP includes an aerodynamically streamlined body that may have the topology of a torus. The body may be inflated with a lighter-than-air gas in an amount sufficient to provide lift to the high altitudes. The HAP has a duct extending through the pressurized body that diverts flow through the duct and reduces aerodynamic drag. The HAP may include one or more propellers situated in the duct to provide propulsion and maintain a given location of the HAP relative to ground. There may also be a control system, a solar energy collection system, an energy storage system, and/or any of a variety of payloads to accomplish various tasks, such as communication and/or situational awareness applications.

20 Claims, 4 Drawing Sheets

(56) References Cited

U.S. PATENT DOCUMENTS

| | | |
|---|---|---|
| 1,067,086 A | 7/1913 | Wells et al. |
| 1,457,024 A | 5/1923 | Franzen |
| 1,471,764 A | 10/1923 | Wheeler |
| 1,581,336 A | 4/1926 | Ellithorpe |
| 1,608,461 A | 11/1926 | Cogswell |
| 1,809,680 A | 6/1931 | Egan |
| 1,835,260 A | 12/1931 | Barrera |
| 1,876,153 A | 9/1932 | Spurrier |
| 1,879,345 A | 9/1932 | Lawrence |
| 1,895,518 A | 1/1933 | Peck |
| 2,465,457 A | 3/1949 | Johnston |
| 2,475,786 A | 7/1949 | Jordan |
| 3,185,411 A | 5/1965 | Gembe |
| 3,346,216 A | 10/1967 | Desmarteau |
| 3,533,578 A | 10/1970 | Lesh |
| 4,350,898 A | 9/1982 | Benoit |
| 5,071,090 A | 12/1991 | Takahashi et al. |
| 6,305,641 B1 | 10/2001 | Onda |
| 6,766,982 B2 | 7/2004 | Drucker |
| 8,342,442 B1 | 1/2013 | Dancila |
| 2002/0109045 A1* | 8/2002 | Beach ................... B64B 1/00 244/33 |
| 2006/0284002 A1* | 12/2006 | Stephens ................ B64C 15/00 244/12.4 |
| 2009/0152391 A1* | 6/2009 | McWhirk ................ B64B 1/02 244/30 |
| 2012/0018571 A1* | 1/2012 | Goelet ................... B64B 1/005 244/30 |
| 2013/0037650 A1* | 2/2013 | Heppe .................... B64B 1/54 244/2 |
| 2013/0256459 A1* | 10/2013 | Barber ................... B64B 1/26 244/171.1 |
| 2014/0224938 A1* | 8/2014 | Barber ................... B64B 1/06 244/164 |
| 2014/0377066 A1* | 12/2014 | Anderson .............. F03D 1/065 416/44 |

OTHER PUBLICATIONS

International Search Report and Written Opinion for International Application No. PCT/US2017/031766, dated Aug. 14, 2017.
Thompson et al., Report No. 397, The drag characteristics of several airships determined by deceleration tests, Report National Advisory Committee for Aeronautics, Jan. 1932, pp. 665-677, available at <https://ntrs.nasa.gov/search.jsp?R=19930091470>.

\* cited by examiner

SYSTEMS AND METHODS FOR LIGHTER-THAN-AIR HIGH ALTITUDE PLATFORMS

BACKGROUND

Field

The present invention relates to aircraft. In particular, features for lighter-than-air high altitude platforms are disclosed.

Description of the Related Art

Long-lived assets located in positions of interest above the earth's surface have proven of great value for a host of applications, but to date this has only been practical with satellites in orbits well above the earth's atmosphere. There have been numerous attempts to develop assets of this type for use within the earth's atmosphere, but the need to provide enough energy to overcome wind-induced drag has precluded the use of modest-sized craft and has led to the development of giant semi-rigid airships with very substantial power generation capacity. These airships are as expensive as large manned airplanes and their logistics present serious obstacles to the user. As a consequence, no assets of this type are presently deployed. Fleets of free-flying (unpowered) lighter-than-air craft have been deployed to demonstrate area coverage for communication purposes, but this entails a large constellation of modest sized balloons which travel around the globe at fixed latitude on the prevailing winds at high altitudes. The challenge remains to demonstrate a practical, affordable platform that is sufficiently aerodynamic and energy efficient to accomplish station-keeping (staying aloft at the same latitude and longitude) for long periods of time.

SUMMARY

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems and methods for high altitude platforms.

The development relates to an energy efficient lighter-than-air high altitude platform (HAP) that allows for sustained station keeping, i.e. remaining stationary with respect to ground, with one or more payloads at very high altitudes and for prolonged periods of time. The HAP allows for a range of communication and surveillance capabilities to be supported. Among these capabilities is a source of global positioning system (GPS) information even in the presence of ground-based jammers, because signals from HAP-delivered payloads can be thousands of times stronger than those from existing satellites, which are located at far higher altitudes. Other possible capabilities include but are not limited to a range of communications and communication collection payloads. The HAP can communicate with a region on the earth's surface spanning hundreds of miles.

The HAP includes an aerodynamically streamlined body that reduces drag on the HAP. The body may have the topology of a torus. The body may be inflated with a lighter-than-air gas, such as hydrogen or helium, and in an amount sufficient to provide lift such that the HAP can reach and maintain very high altitudes. The body may be pressurized with such gas. The internal pressure may be less than the ambient atmospheric pressure at launch but greater than the ambient pressure at these high altitudes. Such altitudes may include, for example, heights of 50,000-80,000 feet above sea level. A duct may extend through the body of the HAP and provide for further reduced drag on the HAP. The HAP is capable of steering to and remaining at any desired location above the earth's surface for many days, weeks or even months at an altitude within the atmosphere suitable for communication and/or situational awareness purposes. The HAP has a duct extending through the pressurized body. The duct may extend centrally through the body. The duct may have a first, frontward opening that faces and is aligned approximately parallel to the direction of the freestream flow in the atmosphere. Such alignment may impact, for example reduce, the drag on the HAP by diverting a portion of the freestream flow into and through the duct, such that the diverted flow exits the duct out a second, rearward opening. The HAP may include one or more propellers situated in the duct, for example, in a forward portion of the duct, to provide propulsion and maintain a given location of the HAP relative to ground. Without the addition of propeller(s), the duct alone may result in a net increase in the total drag on the HAP, but inclusion of the propeller(s) and the associated pressure changes in the duct may reduce the effective total drag on the HAP. The HAP may also include a control system to provide stable, predictable motion of the craft, a solar energy collection system to provide energy for propulsion, control, and/or payload systems, an energy storage system to allow continuous operation spanning diurnal cycles, and/or any of a variety of payloads to accomplish desired functions such as communication and/or situational awareness applications.

In an aspect, a high altitude platform is described. The platform comprises an inflatable body, a duct, and a propeller. The inflatable body is configured to contain a gas therein in an amount effective to provide lift such that the vehicle can reach a minimum altitude of 50,000 feet, wherein the body when inflated has a front with a first opening and a rear with a second opening at opposite ends of the body, wherein the distance from the front to the rear defines an inflated body length, and wherein the inflated body length is greater than a maximum width of the inflated body. The duct is disposed through the body and having a plurality of cross-sectional areas, the duct having a length extending at least from or near the first opening at the front of the body to or near the second opening at the rear of the body, wherein the plurality of cross-sectional areas decreases from the first opening to a forward portion of an intermediate region of the duct, wherein the intermediate region is located closer to the first opening than to the second opening, and wherein the plurality of cross-sectional areas increases from a rearward portion of the intermediate region to the second opening. The propeller is positioned in the duct between the first and second openings.

In some embodiments, the body when inflated has a surface area drag coefficient of about 0.002 in a freestream flow having a speed relative to the body of about twenty meters per second (m/s) and having a Reynolds Number of about $4.8 \times 10^6$.

In some embodiments, the drag force on the high altitude platform is less than about 14 pounds (lbs) at an altitude of about 65,000 feet in a freestream flow having a speed relative to the body of about twenty meters per second (m/s).

In some embodiments, the high altitude platform has a lifting capability of at least about 410 kg.

In some embodiments, the high altitude platform further comprises a solar panel coupled with the vehicle and configured in conjunction with an electrical energy store to provide electrical power to the vehicle. In some embodiments, the high altitude platform further comprises a control surface configured to orient the vehicle such that the front faces a freestream flow. In some embodiments, the high altitude platform further comprises a payload coupled with the vehicle and comprising a communication system.

In some embodiments, the propeller is positioned in the duct between the first and second openings at a position that is located at a distance of about 10% or less of the length of the duct from the forward portion of the intermediate region.

In another aspect, a high altitude platform is described. The high altitude platform comprises an inflatable body, a duct and a first propeller. The inflatable body has a front and a rear located a distance L from the front, the body is configured to contain at least 3,000 cubic meters of a buoyant gas therein to provide lift, the buoyant gas is selected from hydrogen, helium or mixtures thereof, and the body when inflated has a maximum width at a location that is from about 35% to 45% of L from the front. The duct extends through the body from the front to the rear and comprises a first opening at the front of the body having a first cross-sectional area, a second opening at the rear of the body having a second cross-sectional area, and an intermediate region having a forward portion that is located closer to the first opening than the second opening, with the intermediate region having a minimum cross-sectional area equal to a third cross-sectional area, and the first and second cross-sectional areas are each greater than the third cross-sectional area. The first propeller is positioned in the intermediate region of the duct.

In some embodiments, the high altitude platform further comprises a plurality of converging cross-sectional areas from the first cross-sectional area to the third cross sectional area, and the plurality of converging cross-sectional areas continuously decrease from the first cross-sectional area to the third cross-sectional area. In some embodiments, the high altitude platform further comprises a plurality of diverging cross-sectional areas from the third cross-sectional area to the second cross sectional area, and the plurality of diverging cross-sectional areas continuously increase from the third cross-sectional area to the second cross-sectional area. In some embodiments, a divergence angle of the duct from the intermediate region to the second opening is at least about 1.3 degrees. In some embodiments, the high altitude platform further comprises a solar panel coupled with the vehicle and configured in conjunction with an electrical energy store to provide electrical power to the vehicle. In some embodiments, the high altitude platform further comprises a control surface configured to orient the vehicle such that the front faces a freestream flow. In some embodiments, the high altitude platform further comprises a payload coupled with the vehicle and comprising a communication and/or surveillance system. In some embodiments, the high altitude platform further comprises one or more additional propellers located in the duct near the first propeller, and the first propeller and the one or more additional propellers are configured such that the total angular momentum of the first propeller and the one or more additional propellers when operating generates a net torque on the platform that is within a control range of a control system of the platform.

In some embodiments, the body is formed of a thin-walled structure having an average thickness of less than about 0.1 inches.

In another aspect, a method of providing sustained high-altitude flight with a lighter-than-air craft is described. The method comprises inflating a thin-walled body with at least 3,000 cubic meters of a lighter-than-air gas, where the inflated body has a front and a rear located a distance L from the front, and the body when inflated has a maximum width at a location from about 35% to 45% of L from the front, and a duct having one or more propellers therein extends through the body from the front to the rear. The method further comprises flying the craft to a height of at least 50,000 feet and orienting the craft such that the front faces a freestream flow.

In some embodiments, method further comprises operating the craft in the freestream flow such that the craft is generally stationary with respect to ground at a height of at least 50,000 feet. In some embodiments, method further comprises keeping the craft stationary at a height of at least 50,000 feet for at least 30 days. In some embodiments, method further comprises communicating using a communication device onboard the craft.

These and other embodiments are described in greater detail below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Figure 1:
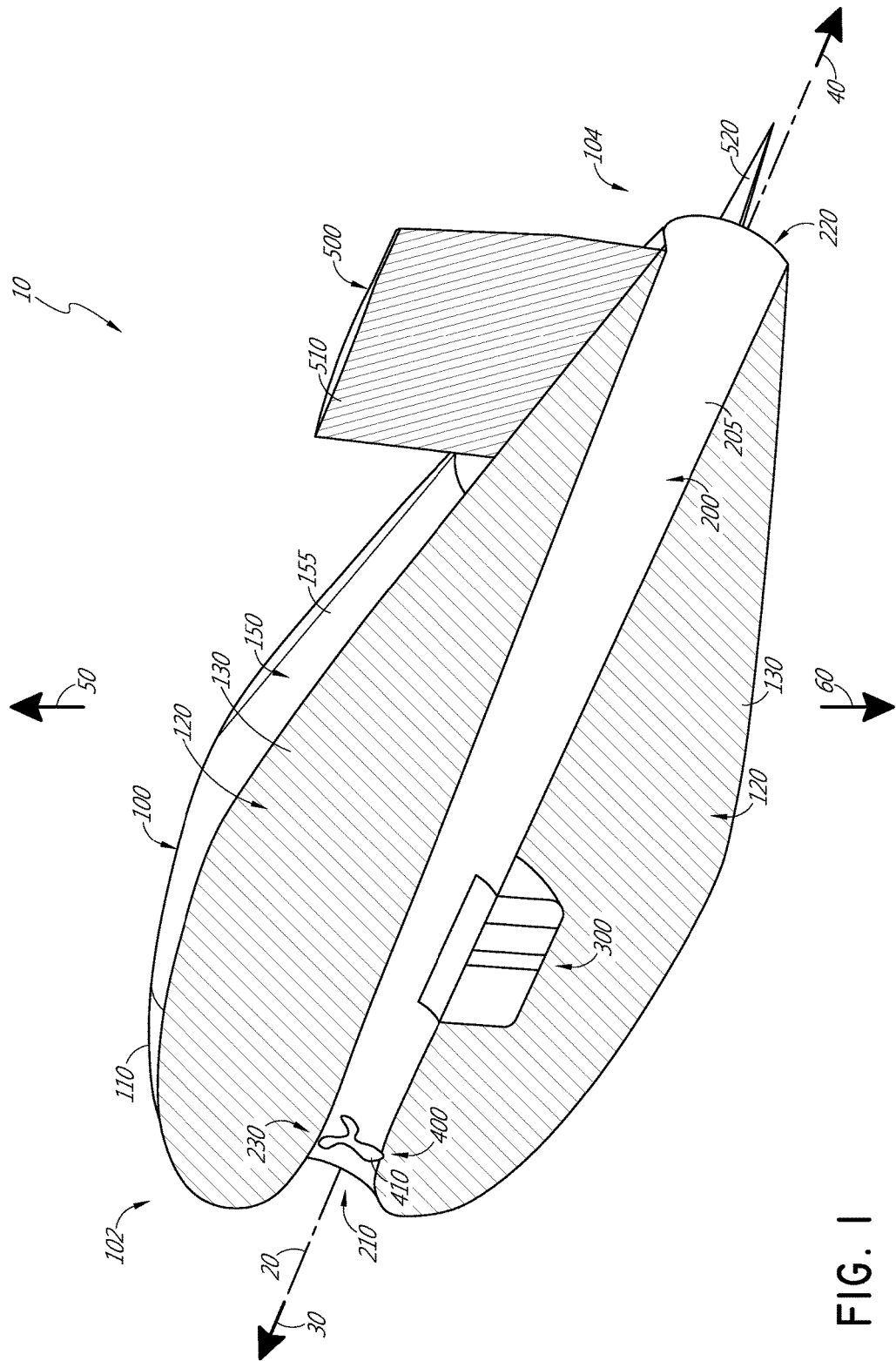
FIG. 1 is a perspective view of an embodiment of a lighter-than-air high altitude platform having a duct, with a portion of the high altitude platform removed for clarity.

FIG. 1 is a perspective view of an embodiment of a lighter-than-air high altitude platform (HAP) 10. The HAP 10 is only partially shown for clarity. Half of the HAP 10 has been removed in FIG. 1 so that interior components and features are more easily understood.

The HAP 10 may be described with respect to various directions and orientations. To facilitate such description, a central axis 20 is indicated as shown. The axis 20 may be defined by a duct 200, as further described. A forward direction 30 is defined as shown. The forward direction 30 indicates, unless context dictates otherwise, the direction that the front of the HAP 10 is facing. Further, a rearward direction 40, an upward direction 50 and a downward direction 60 are also defined as shown. The forward direction 30 and rearward direction 40 are parallel to each other and extend in opposite directions. In some embodiments, as described herein, forward direction 30 and rearward direction 40 may be parallel to and/or align with the axis 20. The upward direction 50 and downward direction 60 are parallel to each other in opposite directions and perpendicular to the forward direction 30 and rearward direction 40. In some embodiments, as described herein, the upward direction 50 and downward direction 60 may be perpendicular to the axis 20.

The HAP 10 includes an inflatable body 100. The body 100 is shown in FIG. 1 in an inflated configuration. The body 100 may have a different size and/or shape when uninflated and/or when underinflated. As shown, the inflated body 100 includes a front 102 and a rear 104. The front 102 is located in the forward direction 30 of the HAP 10. The rear 104 is located opposite the front 102 in the rearward direction 40 of the HAP.

The HAP 10 includes a body wall 110. The body wall 110 may form a portion of the body 100. The wall 110 may be a thin-walled structure. For example, the wall 110 may be formed from a polymer film of appropriate thickness. In some embodiments, the wall 110 may be formed from a polyethylene-based material. In some embodiments, the wall 110 may be formed from a polyethylene terephthalate material, for example mylar. Other suitable materials may be used. The wall 110 may have a thickness of about 0.1 inches. The wall 110 may have a thickness of less than about 0.1 inches. The wall 110 may have an average thickness of about 0.1 inches. The thickness of the wall 110 may be uniform. In some embodiments, the thickness of the wall 110 may not be uniform, such that the wall 110 has variable thicknesses. In some embodiments, the wall 110 may have a thickness from about 0.03 inches to about 0.17 inches. In some embodiments, the wall 110 may have a thickness from about 0.05 inches to about 0.15 inches. In some embodiments, the wall 110 may have a thickness of about 0.08 inches to about 0.12 inches.

The wall 110 defines, at least in part, an inflatable volume 120. The volume 120 is a space configured to receive a lighter-than-air gas 130 therein. The volume 120 may be defined in part by the wall 110 and in part by another portion or portions of the HAP 10. In some embodiments, the volume 120 may be defined by the wall 110 and the duct 200, as described herein. In some embodiments, the volume 120 may be defined by rotating a two-dimensional shape about the axis 20. The rotated two-dimensional shape may be in a plane containing the axis 20, such that the volume 120 is cylindrically symmetric about the axis 20 in the plane perpendicular to the axis 20. In some embodiments, the volume 120 may have deviations from this cylindrical symmetry. The volume 120 may be symmetric with respect to reflection in a vertical plane intersecting the axis 20 and the upward direction 50. In some embodiments, the volume 120 may be asymmetric with respect to reflection in a vertical plane intersecting the axis 20 and the upward direction 50. The volume 120 may be symmetric with respect to reflection in a horizontal plane intersecting the axis 20 and perpendicular to the upward direction 50. In some embodiments, the volume 120 may be asymmetric with respect to reflection in a horizontal plane intersecting the axis 20 and perpendicular to the upward direction 50. Thus, the volume 120 may have a variety of shapes, whether symmetric, asymmetric, cylindrical, non-cylindrical, circular, non-circular, etc.

The volume 120 may be isolated from the external environment in order to retain the lighter-than-air gas 130 contained therein. The volume 120 may be continuous. As shown, the volume 120 may extend around the duct 200 to define a single, continuous volume. In some embodiments, the volume 120 may be discontinuous. For example, there may be multiple, discrete portions of the volume 120. There may be multiple cells that define the volume 120. Multiple cells or other portions of the volume 120 may provide a more robust and reliable lifting mechanism by reducing the risk of catastrophic puncture to the volume 120. For instance, a bird or other object may collide with the HAP 10 and only puncture a portion of the volume 120 such that only that portion loses the gas 130, while separate portions of the volume 120 may be unaffected by such collision and not lose their respective gases 130 therein.

The total volume occupied by the volume 120 may change based on the altitude and internal pressure of the volume 120, as further described herein. The total volume occupied by the volume 120 may therefore be a variety of suitable amounts. In some embodiments, the total volume occupied by the volume 120 is about 1000 $m^3$ to 13,000 $m^3$. In some embodiments, the total volume occupied by the volume 120 is about 4400 $m^3$. The total volume occupied by the volume 120 may depend on the mass and energy requirements of the various systems of the HAP 10, such as a payload 340.

The volume 120, and/or other portions of the HAP 10, may contain a total amount of the gas 130 sufficient to provide lift to the HAP 10. In some embodiments, the HAP 10 contains a sufficient amount of the gas 130 such that the HAP 10 can reach a minimum altitude of 50,000 feet. In some embodiments, the HAP 10 contains a sufficient amount of the gas 130 such that the HAP 10 can reach altitudes of 55,000 feet, 60,000 feet, 65,000 feet, 70,000 feet, 75,000 feet, 80,000 feet, and/or any lower, intermediate, or greater altitude. "Altitude" here refers to the height above sea level for a given latitude and longitude of the HAP 10. Keeping the HAP 10 above a designated point on the Earth requires an expenditure of energy to oppose any wind currents in the atmosphere. In some embodiments, the HAP 10 is maintained at an altitude or range of altitudes where the prevailing wind speeds are relatively lower compared to other altitudes. In some embodiments, the HAP 10 is maintained at about 60,000-75,000 feet, where the wind speed may average about 10-20 miles per hour (mph).

As mentioned, the HAP 10 may include the lighter-than-air gas 130. In some embodiments, the gas 130 may be hydrogen. In some embodiments, the gas 130 may be helium. In some embodiments, the gas 130 may be mixtures of hydrogen and helium. The gas 130 may be provided in and received by the volume 120.

Table 1 provides embodiments of various densities for the lighter-than-air gas that may be used. The gas 130 may have various densities. The densities may change, for example, as the HAP 10 climbs to altitudes having colder temperatures, launches in different seasons or geographic areas with various temperatures, etc. In some embodiments, particular values for the density of either helium or hydrogen may be supplied. In Table 1, the densities are shown at various temperatures and altitudes, and for reference are compared with atmospheric air at those temperatures and altitudes. Because the HAP 10 is lifted due to being lighter than the volume of displaced ambient air, the gas density is lower than the density of the ambient air, for a given temperature and altitude. In some embodiments, the density may change by about 10% due to differences in temperature. The HAP 10 may be "neutrally buoyant" at high altitudes, as described herein, thus the densities for atmospheric air are also shown for reference.

TABLE 1

Various densities for the lighter-than-air gas, at various temperatures and altitudes, compared with air for reference.

| Gas | Density #1 ($kg/m^3$) (15° C., Sea level) | Density #2 ($kg/m^3$) (−57° C., 65,000 feet) | Density #3 ($kg/m^3$) (−73° C., Sea level) | Density #4 ($kg/m^3$) (−73° C., 65,000 feet) |
|---|---|---|---|---|
| Helium | 0.1687 | 0.0124 | 0.1780 | 0.0137 |
| Hydrogen | 0.0853 | 0.0063 | 0.0900 | 0.0069 |
| Air | 1.2247 | 0.0900 | 1.2920 | 0.0992 |

The body 100 may be pressurized. The volume 120 of the body 100 may be pressurized with the gas 130. The pressurized body 100, and/or other pressurized portions of the HAP 10, may be described as "under-inflated," "sub-pressurized," and the like, when inflated to a pressure that is less than ambient atmospheric pressure. The pressurized body 100, and/or other pressurized portions of the HAP 10, may be described as "over-inflated," "super-pressurized," and the like, when inflated to a pressure that is greater than ambient atmospheric pressure. In some embodiments, the body 100 may be pressurized at a pressure that is less than the ambient atmospheric pressure (i.e. under-inflated) at the launch site but which is more than the ambient atmospheric pressure (i.e. super-pressurized) at a higher altitude. Both of these conditions may be met with a single pressure due to the decrease in ambient atmospheric pressure associated with increasing altitude. In some embodiments, the gas within the body 100 and/or other portions of the HAP 10 may have a pressure that is about 0.1 psi greater than the ambient atmospheric pressure at a station keeping high altitude. In some embodiments, the gas within the body 100 and/or other portions of the HAP 10 may have a pressure of about 1 pound per square inch (psi) at about 60,000 feet. In some embodiments, the gas within the body 100 and/or other portions of the HAP 10 may have a pressure of about 0.6 psi at about 75,000 feet.

In some embodiments, and as further described herein, at launch the body 100 may be underinflated and the desired aerodynamic, streamlined shape of the body 100 may take form at or near the station keeping high altitude. The body 100 may thus be super-pressurized at its station keeping high altitude so that the body 100 has its desired aerodynamic shape at this altitude. Otherwise, the surface characteristics such as the contour of the body 100 would fluctuate and the drag on the HAP 10 would not be maintained at its minimum value, meaning that more energy would need to be expended to keep the HAP 10 at its desired station keeping location.

As mentioned, the HAP 10 may be maintained at a station keeping high altitude continuously for many days or several months. Energy collection by the HAP 10, while in flight and/or while station keeping, supports this ability. Toward this end, the HAP 10 may include a solar energy system 150. In some embodiments, the system 150 may be coupled with the body 100. In some embodiments, the system 150 may form a portion of the body 100. The system 150 may conform to the desired final shape of the body 10. In some embodiments, the system 150 or portions thereof may be located inside the body 100.

The solar energy system 150 may include one or more solar panels 155. The panels 155 may be coupled with the body 100 or may define portions thereof. As shown, the panels 155 may be located on an upper (as oriented in FIG. 1) portion of the body 100. The panels 155 may collect solar energy from the sun to be stored and used by the HAP 10, as described herein.

The HAP 10 includes the duct 200. The duct 200 may be an opening extending through the HAP 10. The duct 200 may define the axis 20. For example, the axis 20 may be a geometric center of a plurality of cross sections of the duct 200 from one end to the other of the duct 200. In some embodiments, the duct 200 may have concentric, circular or elliptical cross-sections along its length, and thus the axis 20 may be defined by the center points of these geometric cross-sections of the duct 200.

The duct 200 may include a duct wall 205. The wall 205 may be a lightweight, rigid structure. The wall 205 may be formed from a variety of materials, including composite materials having reinforcing fibers such as carbon or graphite fibers embedded in an epoxy and/or plastic matrix, or metals such as aluminum. Other suitable materials may be used. The wall 205 may have external ring ribs, for example to add stability to the structure. In some embodiments, portions of the body 100 such as the wall 110 may be transparent to visible light. The body 100 may be transparent and the solar energy system 150 may be mounted directly on the exterior of the duct 200, such as on the exterior of the duct wall 205, such that light can travel through the transparent portions of the body 100 and be collected by the system 150. Portions of the duct 200, such as the duct wall 205, may define in part the inflatable volume 120. In some embodiments, the body wall 110 may couple with the ends of the duct 200, such as at or near opposing ends of the duct 200, such that outer surfaces of the duct wall 205 in between the ends of the duct 200, along with inner surfaces of the body wall 110, define at least in part the volume 120.

The duct 200 defines a first opening 210 and a second opening 220. The first opening 210 is located at a forward 30 portion of the HAP 10. The first opening 210 may be located at the front 102 of the body 100. In some embodiments, the first opening 210 may be located further rearward 40 than the front 102 of the body. For example, the first opening 210 may be located farther rearward 40 than a forward-most 30 portion of the body 100. In some embodiments, the first opening 210 may be located further forward 30 than the front 102 of the body. For example, the first opening 210 may be located farther forward 30 than a forward-most 30 portion of the body 100.

The second opening is located at a rearward 40 portion of the HAP 10. The second opening 220 may be located at the rear 104 of the body 100. In some embodiments, the second opening 220 may be located further forward 30 than the rear 104 of the body 100. For example, the second opening 220 may be located farther forward 30 than a rearward-most 40 portion of the body 100. In some embodiments, the second opening 220 may be located further rearward 40 than the rear 104 of the body 100. For example, the second opening 220 may be located farther rearward 40 than a rearward-most 40 portion of the body 100.

Figure 2:
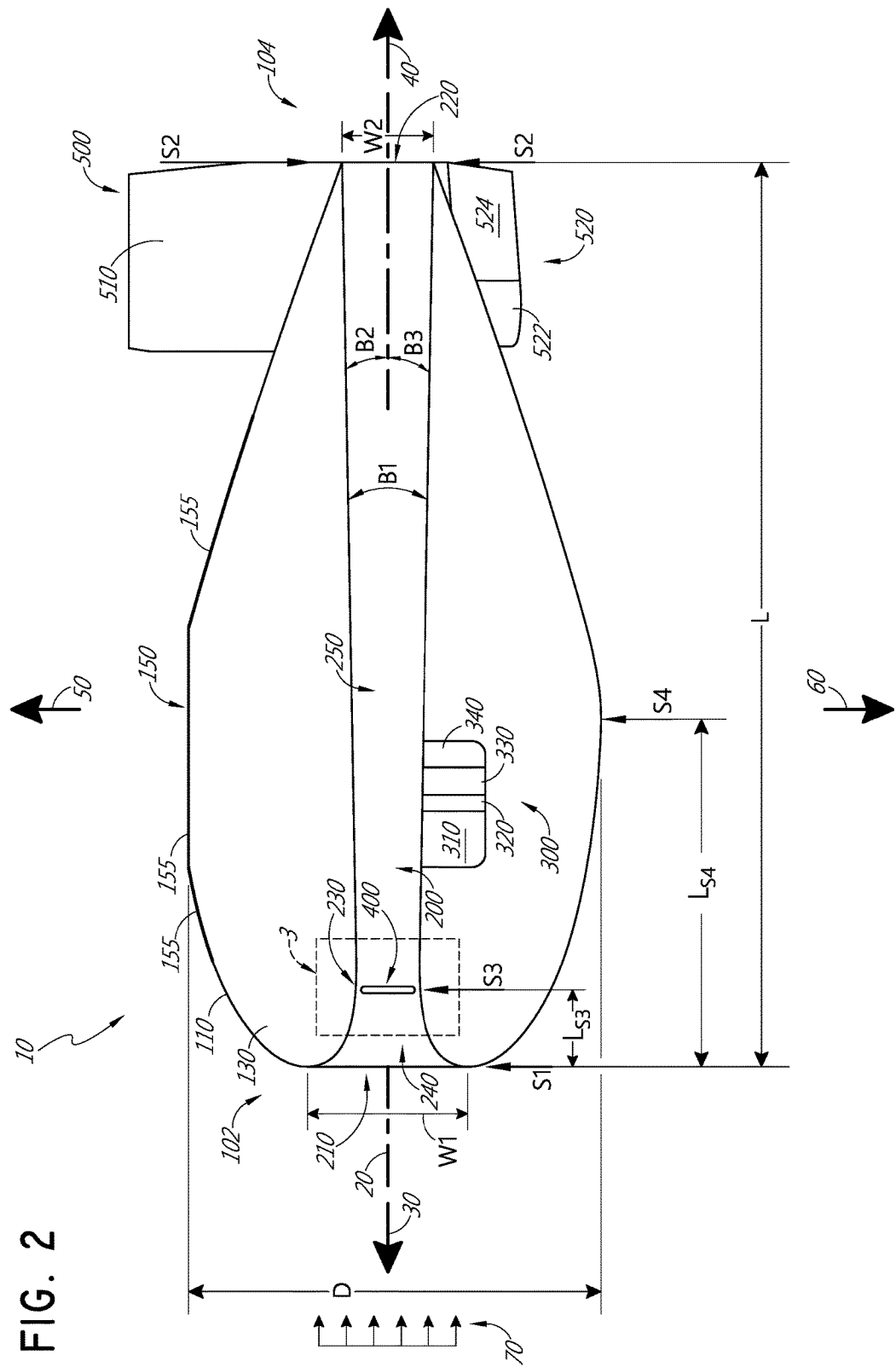
FIG. 2 is a side cross-section view of the high altitude platform of FIG. 1.

The duct 200 may include an intermediate region 230. As shown in FIG. 2, the region 230 may be located closer to the first opening 210 than to the second opening 220. As shown, the region 230 may be located very close to the first opening 210. This is merely an example and the region 230 may be located anywhere along the duct 200 that is closer to the first opening 210 than to the second opening 220. In some embodiments, the region 230 may be located anywhere along the duct 200, including closer to the second opening than to the first opening 210. The intermediate region 230 may include one or more propellers 400, as described herein. In some embodiments, the intermediate region 230 may refer to an inner volume of the duct 200 at particular longitudinal lengths or stations of the duct 200, as described herein.

In some embodiments, portions of the duct 200 at and/or near the first and second openings 210, 220 of the duct 200 may couple with the body wall 110, such that outer surfaces of the duct wall 205 in between the first and second openings 210, 220, along with inner surfaces of the body wall 110, define at least in part the volume 120. In some embodiments, outer surfaces of the duct wall 205 at the intermediate region 230 may define at least in part the volume 120.

The duct 200 reduces drag on the HAP 10 in flight. The reduction in aerodynamic drag on the HAP 10 is caused by the propeller 400 action in the duct 200. This action reduces the pressure on the forward 30 facing surfaces of the duct 200 and opening 210 and on the forward 30 facing surfaces of the HAP 10. It also induces laminar flow on the surfaces thus described and gives rise to a pressure increase aft of the propeller in the duct 200 which provides a forward thrust component. For example, portions of the atmosphere flowing toward the front 102 of the body 100, that would otherwise flow over the HAP 10, instead flow into the duct 200. In some embodiments, a large fraction of the freestream flow 70 in front of the HAP 10 diverts or shifts to the first opening 210. The first opening 210 and/or a forward portion 240 of the duct 200 may be shaped so that the airflow impinges on one or more propeller blades 410 at a constricted portion of the duct 200, such as the intermediate region 230. The duct 200 may then diverge at an angle that prevents boundary layer separation through the full length of the duct 200. In some embodiments, the drag coefficient has been calculated to be more than 40% less than that of the optimal spheroidal shape of the same volume (and hence the same nominal lift capacity).

The HAP 10 may include one or more buses 300. The bus 300 may include various systems, electronics, motors, payloads, etc. as described herein. The bus 300 may be coupled with the HAP 10. As shown, the bus 300 may be coupled with the duct 200. The bus 300 may be located at a downward 60 and forward 30 portion of the HAP 10. In some embodiments, the bus 300 may be located in other locations of the HAP 10, such as an upward 50 location and/or a more rearward 40 location. The bus 300 may also be coupled and/or define other portions of the HAP 10, such as the body 100.

The HAP 10 may include one or more propellers 400. The propeller 400 is configured to provide propulsive thrust to the HAP 10. The propeller 400 may provide thrust to keep the HAP 10 stationary relative to the ground. In some embodiments, the propeller 400 may provide sufficient thrust to move the HAP 10 in the forward 30 direction relative to the ground. The propeller 400 may be located inside the duct 200. As shown, the propeller 400 may be located in the intermediate region 230 of the duct 200. In some embodiments, there may be more than one propeller 400. There may be two or more propellers 400. In some embodiments, the HAP 10 includes a first and second propeller 400 that spin in opposite directions. In some embodiments, the HAP 10 includes two or more propellers 400 configured such that the total angular momentum of the two or more propellers 400 when operating is approximately zero. In some embodiments, the HAP 10 includes two or more propellers 400 configured such that the total angular momentum of the two or more propellers 400 when operating generates a net torque on the platform that is within a control range of a control system of the platform. For example, the resulting net torque may be different from zero but manageable by the control surfaces 500 of the HAP 10 such that the surfaces 500 may counteract any net torque produced by the operating propeller(s) 400. The additional propeller(s) 400 may be located in the duct 200 near the first and/or second propellers 400.

The propeller or propellers 400 may each include one or more blades 410. The blades 410 may be sized to extend over most of the entire width of the portion of the duct 200 in which the propeller is located. In some embodiments, the blades 410 may be sized to extend over less than most of the entire width of the portion of the duct 200 in which the propeller is located. As shown, the propeller 400 may include three blades 410. In some embodiments, the propeller 400 may include fewer or more than three blades 410.

The HAP 10 may include one or more control surfaces 500. The control surfaces 500 may provide aerodynamic control of the orientation and/or direction of flight of the HAP 10. The freestream flow surrounding the HAP 10 in flight may impinge on the control surfaces 500 and thereby provide rotational and/or linear forces on the HAP 10. The control surfaces 500 may be stationary or moveable. Some or all of the control surfaces 500 may be rigid or semi-rigid structures. In some embodiments, some or all the control surfaces 500 may be inflatable structures. In some embodiments, some or all the control surfaces 500 may be inflatable structures that receive the lighter-than-air gas 130. Inflatable control surfaces 500 may be pressurized to the same or different pressures as other pressurized portions of the HAP 10, such as the body 100.

The control surfaces 500 may include a vertical stabilizer 510. The vertical stabilizer 510 may be located at or near the rear 104 of the body 100. The vertical stabilizer 510 may be oriented such that it lies in a plane that intersects the axis 20 and the upward direction 50. The vertical stabilizer 510 may be fixed, moveable, or combinations thereof. There may be more than one vertical stabilizer 510. The vertical stabilizer 510 may also be angled. In some embodiments, there may be two vertical stabilizers 510 that together form a V-shaped tail as viewed from the rearward direction 40.

The control surfaces 500 may include a lateral stabilizer 520. The lateral stabilizer 520 may be located at or near the rear 104 of the body 100. In some embodiments, the lateral stabilizer 520 may be oriented such that it lies in a plane that intersects the axis 20 and is perpendicular to the upward direction 50. As shown, the lateral stabilizer 520 may be angled slightly with respect to such a plane. There may be two or more lateral stabilizers 520. There may be two lateral stabilizers 520 that together form an inverted V-shaped tail as viewed from the rearward direction 40. The lateral stabilizer 520 may be fixed, moveable, or combinations thereof.

FIG. 2 is a side cross-section view of the HAP 10. The HAP 10 is shown oriented toward a freestream flow 70. Only a portion of the flow 70 is indicated for clarity. The flow 70 may surround the entire HAP 10. The flow 70 indicates the direction of flow of ambient atmosphere relative to the HAP 10. Thus, the flow 70 may be present when the HAP 10 is stationary relative to ground, in which case the flow 70 may be the prevailing wind. Further, the HAP 10 may be moving in the forward direction 30 or in the rearward direction 40 relative to ground, and thus the flow 70 may be due to relative movement between the HAP 10 and the ambient atmosphere. In some embodiments, the flow 70 may be due to a combination of the movement of the HAP 10 and the movement of the ambient atmosphere relative to ground. The flow 70 is shown as parallel to the forward direction 30 and axis 20. In some embodiments, the flow 70 may not be parallel to the forward direction 30 and axis 20. For example, the flow 70 may be angled with respect to the forward direction 30 and axis 20.

The flow 70 generally refers to the uninterrupted flow of surrounding atmosphere relative to the HAP 10. Thus, the flow 70 may encounter the HAP 10 and change speed and/or directions, or otherwise become interrupted, as it flows on, over, around and/or through the HAP 10, as described below.

The HAP 10 may have a total length L. The length L may be defined by the distance between the front 102 and the rear 104. In some embodiments, the length L is the distance along the axis 20 between the front 102 and the rear 104. In some embodiments, the length L may be different from the distance along the axis 20 between the front 102 and the rear 104. For example, the duct 200 may be angled with respect to the front 102 and rear 104 of the body 100.

The HAP 10 may have a variety of particular values for the length L. In some embodiments, the length L may be about 20-50 meters. In some embodiments, the length L may be about 30-40 meters. In some embodiments, the length L may be about 36 meters (118 feet).

Various geometric stations S1, S2, S3, S4 may be defined along the length L. A first station S1 may be defined as the location along the length L at the front 102 of the body 100. In some embodiments, the first station S1 is defined as the location of the first opening 210 of the duct 200. A second station S2 may be defined as the location along the length L at the rear 104 of the body 100. In some embodiments, the second station S2 is defined as the location of the second opening 220 of the duct 200. A third station S3 may be defined as the location along the length L at the intermediate region 230 of the duct 200. In some embodiments, the third station S3 is defined as the location along the length L of a particular portion of the intermediate region 230. For example, the third station S3 may be defined as the location of the propeller 400 within the intermediate region 230. The third station S3 may be located at a distance of $L_{S3}$ from the front 102. In some embodiments, the third station S3 may be defined as a forward or rearward portion or boundary of the intermediate region 230, as described herein, for example with respect to FIG. 3. A fourth station S4 may be defined as the location along the length L where the body 100 is widest. In some embodiments, the fourth station S4 may be the location along the length L of the maximum width D, as described herein. The fourth station S4 may be located at a distance of $L_{S4}$ from the front 102.

The body 100 may have a maximum width D. The maximum width D may be the largest linear measurement of opposing outer surfaces of the body 100 as measured perpendicular to the axis 20. Further, the maximum width D may be measured along a vertical or horizontal direction, or any other direction that is perpendicular to the axis 20. As shown in FIG. 2, the maximum width D may be a vertical dimension (as oriented). In some embodiments, the maximum width D may be a horizontal dimension (as oriented). In some embodiments, the body 100 may have a generally circular cross-section such that the width of the body 100 as measured at any station along the length L is the same for any direction. For instance, the vertical and horizontal width of the body 100 may be the same for any given station, or for all stations, along the length L. In some embodiments, the maximum width D may be about 10-25 meters. In some embodiments, the maximum outer width D may be about 17 meters (56 feet).

As mentioned, the maximum width D may be located at the station S4. The station S4 may be located at $L_{S4}$. The fourth station S4 may be located at various locations along the length L (and thus $L_{S4}$ may have various values). In some embodiments, the station S4 may be located at approximately 10-50% of L from the front 102. In some embodiments, the station S4 may be located at approximately 20-40% of L from the front 102. In some embodiments, the station S4 may be located at approximately 25-35% of L from the front 102. In some embodiments, the station S4 may be located at approximately 30% of L from the front 102.

The body 100 may have an aerodynamic contour. "Aerodynamic" here, as well as "streamlined," and the like, refer to drag-reducing. The body 100 may thus have a contour that reduces drag due to, for example, the freestream flow 70. The body 100 may have a variety of shapes, sizes, configurations, arrangements, etc. and still be aerodynamic. Thus, the particular aspects disclosed herein are merely some examples, and other suitable varieties may be implemented.

The body 100 may have a range of aspect ratios to achieve an aerodynamic contour. The "aspect ratio" as used here is the ratio of the length L to the maximum width D of the body 100, i.e. L/D. In some embodiments, the length L is greater than the maximum width D. Thus, the aspect ratio may be greater than 1. In some embodiments, the aspect ratio is from about 1.25-4. In some embodiments, the aspect ratio is from about 1.5-3.5. In some embodiments, the aspect ratio is from about 1.75-3. In some embodiments, the aspect ratio is from about 1.8-2.5. In some embodiments, the aspect ratio is from about 1.9 to 2.3. In some embodiments, the aspect ratio is about 2.1. These are merely some examples, and the aspect ratio may be any lower, intermediate or greater value.

Various geometric parameters of the duct 200 may be defined with respect to the stations S1, S2, S3. At the location of the station S1, the duct 200 may have a first width W1. As mentioned, the first station S1 may correspond to the longitudinal location of the first opening 210 of the duct, "longitudinal" referring to the location along the length L. Thus, in some embodiments, the width W1 may be the size of the width of the first opening 210 of the duct 200. The width W1 may be a diameter, for example where the duct 200 has circular cross-sections. In some embodiments, the width W1 may be a major or minor diameter of a cross-section, for example where the duct 200 has elliptical cross-sections. Thus, the width W1 may only be the size of the duct 200 as measured in the upward and downward directions 50, 60. In some embodiments, the width W1 may be the size of the duct 200 as measured in any direction that is perpendicular to the axis 20. Therefore, at the location of the station S1, the duct 200 may have a first cross-sectional area A1 (not shown) based on the first width W1. In some embodiments, the duct 200 has a circular cross-section at the first station S1, and thus the first cross-sectional area A1 at the first station S1 may be the area of a circle with the first width W1 as the diameter of the circle.

At the location of the second station S2, the duct 200 may have a second width W2. As mentioned, the second station S2 may correspond to the longitudinal location of the second opening 220 of the duct. Thus, in some embodiments, the width W2 may be the size of the width of the second opening 220 of the duct 200. The width W2 may be a diameter, for example where the duct 200 has circular cross-sections. In some embodiments, the width W2 may be a major or minor diameter, for example where the duct 200 has elliptical cross-sections. Thus, the width W2 may only be the size of the duct 200 as measured in the upward and downward directions 50, 60. In some embodiments, the width W2 may be the size of the duct 200 as measured in any direction that is perpendicular to the axis 20. Therefore, at the location of the station S2, the duct 200 may have a second cross-sectional area A2 (not shown) based on the second width W2. In some embodiments, the duct 200 has a circular cross-section at the second station S2, and thus the second cross-sectional area A2 at the second station S2 may be the area of a circle with the second width W2 as the diameter of the circle. In some embodiments, the second width W2 may be about 11.7 feet (3.6 meters).

The third station S3 may be located at a distance of $L_{S3}$ from the front 102, from the first opening 210, and/or from the first station S1. In some embodiments, $L_{S3}$ may be from about five feet to thirty feet. In some embodiments, $L_{S3}$ may be from about ten feet to fifteen feet. In some embodiments, $L_{S3}$ may be about twelve feet. In some embodiments, $L_{S3}$ may be from about 2% to 20% of L. In some embodiments, $L_{S3}$ may be from about 4% to 15% of L. In some embodiments, $L_{S3}$ may be from about 8% to 12% of L. In some embodiments, $L_{S3}$ may be about 10% of L.

Figure 3:
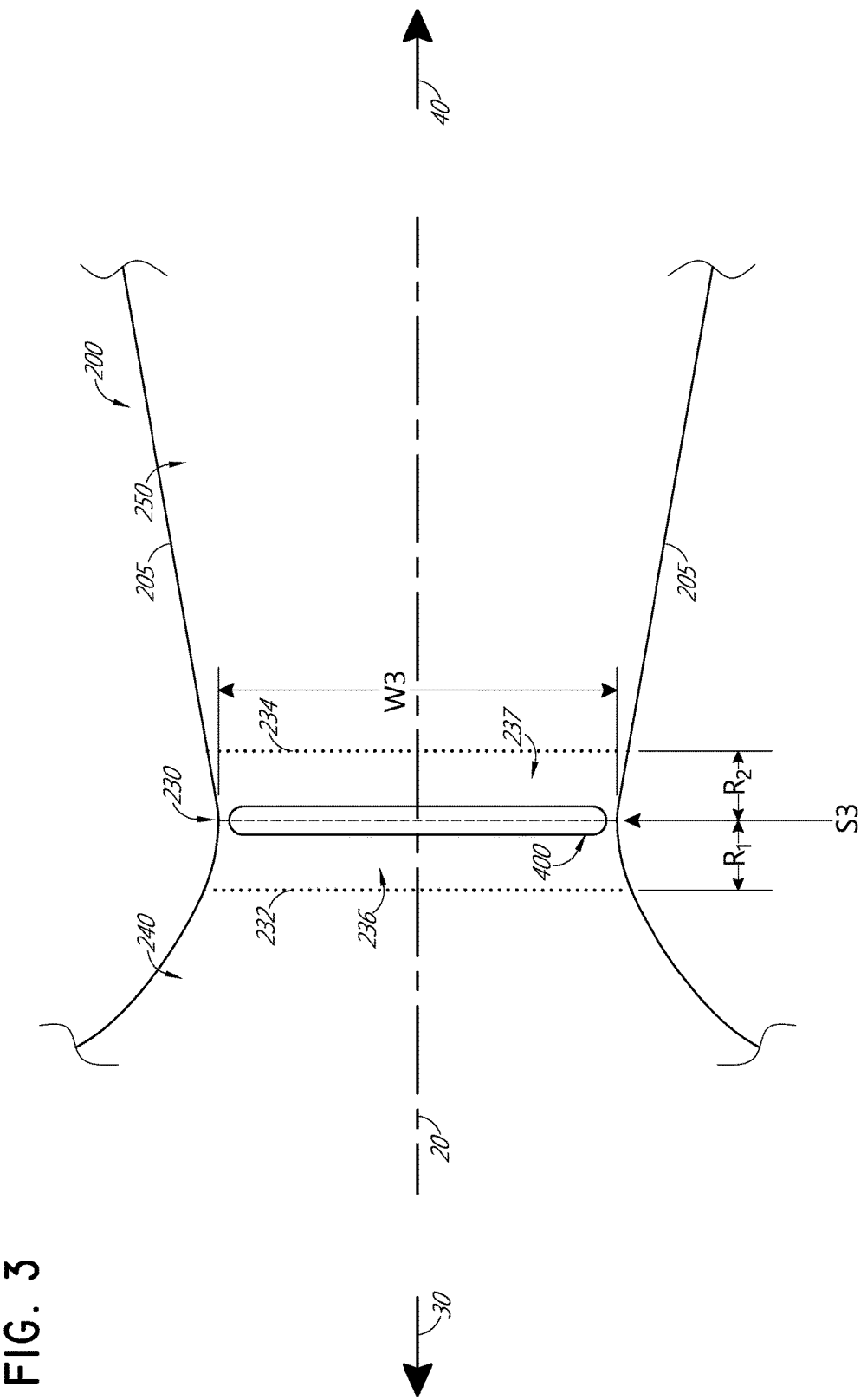
FIG. 3 is a detail view taken from FIG. 2 showing a detail of an embodiment of an intermediate region of the duct.

At the third station S3, the duct 200 may have a third width W3 (as shown in FIG. 3—the area of detail 3 indicated in FIG. 2 is shown in FIG. 3). As shown in FIG. 2, the location $L_{S3}$ of the third station S3 may correspond to the longitudinal location of the intermediate region 230, or a portion thereof. Thus, in some embodiments, the width W3 may be the size of the width of the intermediate region 230, or portions thereof. The width W3 may be a diameter, for example where the duct 200 has circular cross-sections. In some embodiments, the width W3 may be a major or minor diameter, for example where the duct 200 has elliptical cross-sections. Thus, the width W3 may only be the size of the duct 200 as measured in the upward and downward directions 50, 60. In some embodiments, the width W3 may be the size of the duct 200 as measured in any direction that is perpendicular to the axis 20. Therefore, at the location of the station S3, the duct 200 may have a third cross-sectional area A3 (not shown) based on the third width W3. In some embodiments, the duct 200 has a circular cross-section at the third station S3, and thus the third cross-sectional area A3 at the third station S3 may be the area of a circle with the third width W3 as the diameter of the circle. In some embodiments, the third width W3 may be about 8.2 feet (2.5 meters).

The various widths and cross-sectional areas of the duct 200 may be various amounts. As shown, A1 may be greater than each of A2 and A3, and A2 may be greater than A3. In some embodiments, A2 may be greater than each of A1 and A3, and A1 may be greater than A3. In some embodiments, A1 and A2 may each be greater than A3, and A1 and A2 may be equal to each other.

In the embodiments where A1>A3 and A2>A3, the cross-sectional areas of the duct 200 may be described as "converging" and then "diverging" along the axis 20 from the front 102 to the rear 104. The cross-sectional areas of the duct 200 may by converging from the first opening 210 to the intermediate region 230, and then diverging from the intermediate region 230 to the second opening 220. The duct 200 may have continuously decreasing cross-sectional areas from the first opening 210 to the intermediate region 230. The duct 200 may have continuously increasing cross-sectional areas from the intermediate region 230 to the second opening 220. The cross-sectional areas within the intermediate region 230 may have a variety of configurations, as discussed in further detail herein, for example with respect to FIG. 3.

The duct may include a front duct portion 240. The front duct portion 240 may be the portion of the duct 200 that is forward 30 of the intermediate region 230. The front duct portion 240 may be the portion of the duct 200 between the first opening 210 and the intermediate region 230. The front duct portion 240 may be the portion of the duct 200 between the first opening 210 and a forward portion 236 or forward boundary 232 of the intermediate region 230 (shown in FIG. 3). In some embodiments, the forward 30 end of the front duct portion 240 may be defined by other features of the HAP 10 besides the duct 200, such as by the body 100. For instance, from the intermediate region 230, the duct wall 205 may terminate before reaching the first station S1, and features of the body 100 such as the body wall 110 may then continue the contour to the first opening 210. Such configurations are still considered to be a duct extending to the first opening 210. Thus, the forward 30 end of the front duct portion 240 may be defined in various manners. The front duct portion 240 may have a larger cross-sectional area at the first opening 210 as compared to a cross-sectional area at the rearward 40 end of the front duct portion 240. The front duct portion 240 may have continuously decreasing cross-sectional areas from the first opening 210 to the rearward 40 end of the front duct portion 240.

The duct may include a rear duct portion 250. The rear duct portion 250 may be the portion of the duct 200 that is rearward 40 of the intermediate region 230. The rear duct portion 250 may be the portion of the duct 200 between the intermediate region 230 and the second opening 220. The rear duct portion 250 may be the portion of the duct 200 between a rearward portion 237 or rearward boundary 234 of the intermediate region 230 (shown in FIG. 3) and the second opening 220. In some embodiments, the rearward 40 end of the rear duct portion 250 may be defined by other features of the HAP 10 besides the duct 200, such as by the body 100. For instance, from the intermediate region 230, the duct wall 205 may terminate before reaching the second station S2, and features of the body 100 such as the body wall 110 may then continue the contour to the second opening 220. Such configurations are still considered to be a duct extending to the second opening 220. Thus, the rearward 40 end of the rear duct portion 250 may be defined in various manners. The rear duct portion 250 may have a larger cross-sectional area at the second opening 220 as compared to a cross-sectional area at the forward 30 end of the front duct portion 240. The rear duct portion 250 may have continuously increasing cross-sectional areas from the forward 30 end of the rear duct portion 250 to the second opening 220.

The cross-sectional areas of the rear duct portion 250 may continuously increase from the forward 30 end of the rear duct portion 250 to the second opening 220. In some embodiments, the cross-sectional areas of the rear duct portion 250 may continuously increase from the forward 30 end of the rear duct portion 250 to a portion of the duct 200 near the second opening 220. For example, in some embodiments the second opening 220 may have a lip or other feature that changes the rate of increase of cross-sectional area at that location. In some embodiments, the increase in cross-sectional area may be uniform. By "uniformly" it is meant that the rate of increase in cross-sectional area may be constant along the length of the rear duct portion 250. Further, "uniform" and "continuous" also include slight variations in the rate of change of cross-sectional area, for example to account for rivets or other structural features of the duct 200 that may alter slightly the exact "uniformity" or "continuity" of the rate of change of the cross-sectional area of the duct 200 but still allow the duct 200 to perform its aerodynamic functions, as described herein.

The rate of increase in the cross-sectional areas of the rear duct portion 250 may be configured in various manners. In some embodiments, the rear duct portion 250 may be configured such that a cross-section of the rear duct portion 250, as shown in FIG. 2, may define an angle B1. The angle B1 may be the angle between opposing portions of the duct wall 205 of the rear duct portion 250. "Opposing" here refers to one hundred eighty degrees across from each other. As shown, the angle B1 may be defined as the angle between an upward 50 portion of the duct 200 and an opposing downward 60 portion of the duct 200. For a circular cross-section duct 200, this angle B1 may be the same as measured in any direction for a given longitudinal cross-section of the duct 200. "Longitudinal cross-section" here is understood to mean a cross-section of the duct 200 as taken along a longitudinal plane that intersects the axis 20 defined by the duct 200.

The angle B1 may define the divergence angle of the duct 200. In some embodiments, the angle B1 is from about 0.25° to about 5°. In some embodiments, the angle B1 is from about 0.5° to about 3°. In some embodiments, the angle B1 is from about 0.75° to about 2°. In some embodiments, the angle B1 is from about 1° to about 1.75°. In some embodiments, the angle B1 is about 1.3°.

In some embodiments, the rear duct portion 250 may be configured such that a cross-section of the rear duct portion 250, as shown in FIG. 2, may define two half-angles B2 and B3. The half-angles B2 and B3 may be equal to each other. The half-angles B2 and B3 may each be half of B1. In some embodiments, the half-angles B2 and B3 may not be equal to each other. For example, the rear duct portion 250 may diverge at a first rate along a first portion or portions of the duct wall 205 and may diverge at a second rate that is different from the first rate along a second portion or portions of the duct wall 205 that are different from the first portion or portions of the duct wall 205. In some embodiments, B2 may be approximately 0.6°, or any smaller, intermediate or greater amounts. In some embodiments, B3 may be approximately 0.6°, or any smaller, intermediate or greater amounts.

The duct 200 may be configured based on aerodynamic considerations. In some embodiments, the duct 200 is sized and shaped to minimize drag through the duct 200. In some embodiments, the front duct portion 240, the intermediate region 230, and/or the rear duct portion 250 may be configured to maximize laminar flow of the freestream flow 70 diverted through the duct 200. In some embodiments, the front duct portion 240 and the intermediate region 230 ahead of the propeller 400 may be configured to maximize laminar flow of the freestream flow 70 diverted through the duct 200. The various aspects of the duct 200 described herein— including but not limited to the cross-sectional areas of the duct 200 as a function of L, the rate of convergence of the forward portion 240 of the duct 200, the rate of divergence of the rearward portion 250 of the duct 200, the duct angles A1, A2, A3, the widths W1, W2, W3, etc.—may be determined based on minimizing aerodynamic drag, for example by maximizing laminar flow, through the duct 200.

In some embodiments, a low aerodynamic drag condition, for example maximal laminar flow, may result externally over the front 102 of the body 100 and throughout the duct 200 ahead of the propeller 400. This is accomplished through selection of appropriate values for the various aspects of the duct 200 and of the external envelope or contour of the body 100 and other portions of the HAP 10. In some embodiments, flow over the HAP 10 transitions from laminar to turbulent flow further in the rearward 40 direction compared to conventional lighter-than-air high altitude platforms. The body 100 may be configured, e.g. shaped, such that laminar flow occurs at least in the front 102 of the HAP 10. The flow over the HAP 10 may transition to fully turbulent flow in the rear 104 of the HAP 10. The exact location where the flow transitions from laminar to turbulent depends on the Reynolds number and the particular pressure gradients and surface characteristics of the body 100. For example, when the body 100 is inflated, the rear is located a distance L from the front 102. In some embodiments, the transition from laminar to turbulent flow may occur at a location that is from about 30% to 45% of L from the front 102, e.g. about 30% to 45% of L from the first station S1. The resulting boundary layers reduce the drag characteristics of the HAP 10. In addition to the various aspects of the duct 200 described herein, the various aspects of other features of the HAP 10—including but not limited to the maximum width D, the length L, the longitudinal location of D along L, the aspect ratio, etc.—may be determined based on reducing the drag coefficient of the HAP 10, as described herein.

Table 2 shows values for various parameters of an embodiment of the HAP 10 and the resulting drag force in a given environment, as compared to a reference craft. The parameter values for the HAP 10 are shown in the third column of Table 2, while the second column lists parameter values for a reference craft having a comparable enclosed volume for the lifting gas (and thus comparable lifting capability) but that does not have any opening extending through the craft, such as the duct 200. The exemplary values are given for an altitude of 65,000 feet, with 410 kilograms (kg) of lifting capacity, and a free stream flow 70 of twenty meters per second (m/s). (Note that higher than average wind speeds are used for this calculation because the ability to station-keep for long periods of time may be dominated by performance at higher wind speeds.) As shown, under such circumstances the HAP 10 experiences a drag force that is about half of the drag force experienced by the reference craft under the same circumstances. This drag force may correspond to a Reynolds Number of about $5 \times 10^6$. The drag force may be calculated based on the surface area coefficient of drag $C_d$.

TABLE 2

Resulting drag forces and design parameters for an embodiment of the HAP 10 and a reference craft, each with a lifting capacity of about 410 kg, at an altitude of 65,000 feet, and in a freestream flow of about 20 m/s.
Various Parameters at 65,000 feet, 410 kg lift, 20 m/sec

| Parameter | Reference Craft | HAP 10 |
| --- | --- | --- |
| Length L (m) | 62.2 | 36.2 |
| Max Width D (m) | 13.1 | 17.0 |
| Surface Area (m$^2$) | 1,780 | 1,800 |
| L/D | 4.8 | 2.1 |
| Center of Buoyancy | 0.38 L | 0.39 L |
| Propeller Diameter (m) | 6.0 | 2.5 |
| Drag Force (lbs) | 26.4 | 13.3 |
| Drag Coefficient $C_d$ | 0.0037 | 0.0017 |
| Reynolds Number | $8.4 \times 10^6$ | $4.8 \times 10^6$ |

The HAP 10 may include one or more buses 300. The bus 300 may include one or more flight systems, electronics, controllers, payloads, communication devices, sensors, processors, batteries, etc. As shown, in some embodiments the bus 300 may include a motor 310, an energy store 320, a controller 330 and a payload 340.

The motor 310 may be any suitable motor configured to receive energy from the energy store 320 and to actuate the propeller 400. The propeller 400 and the motor 310 may be connected by a shaft or other power transmission device (not shown).

The energy store 320 may store energy to be used as power by the HAP 10. In some embodiments, the energy store 320 is a battery. The energy store 320 may provide energy to the motor 310 and other power-consuming devices or systems on the HAP 10, including but not limited to the controller 330 and the payload 340. The energy store 320 may receive energy from the solar energy system 150 via appropriate electrical connection and electronics (not shown).

The controller 330 may be any suitable flight controller. The controller 330 may control the various systems and devices of the HAP 10. In some embodiments, the controller 330 may control the control surfaces 500, the propeller 400, the energy store 320 and/or the payload 340. The controller 330 may include any suitable processor, short- and/or long-term memory, software and/or hardware module, receiver and/or transmitter, displays, etc.

The payload 340 may be any device or system to be used or operated for the mission of the HAP 10. Thus, the payload 340 may be exclusive of the other systems needed to merely operate the HAP 10. The payload 430 may include, for example, communications equipment, sensors of various sorts, data processing equipment, etc. In some embodiments, the payload 340 may have a mass from about 10 kg to about 100 kg, or any lower, intermediate or greater masses.

The HAP 10 may include one or more control surfaces 500. The controller surfaces 500 may include one or more lateral stabilizers 520. The lateral stabilizer 520 may include one or more fixed portions 522 and/or one or more moveable portions 524. As shown, the fixed portion 522 may be located at a forward 30 portion of the lateral stabilizer 520. The moveable portion 524 may be located at a rearward 40 portion of the lateral stabilizer 520. The one or more moveable portions 524 may be moved to steer or otherwise orient the HAP 10, and may be controlled by the controller 330.

The various control surfaces 500, such as the fixed portion 522 and/or the moveable portion 524 of the lateral stabilizer and the vertical stabilizer 510 or other surfaces, may be used to maintain an orientation of the HAP 10. For example, the various control surfaces 500 may maintain the front 102 of the HAP 10 facing the freestream flow 70. The control surfaces 500 may passively maintain such an orientation due to the momentum imparted on the control surfaces 500 by the freestream flow 70. Thus, the control surfaces 500, for example any moveable portions thereof, may not need to be moved to maintain such an orientation.

The solar energy system 150 may have a variety of arrangements. In some embodiments, there may be one or more solar panels 155. As shown, there may be three solar panels 155. The solar panels 155 may be located along an upward 50 portion of the HAP 10, such as on an upward 50 portion of the body 100. In some embodiments, the solar panels 155 may be flexible, for example to complement the contour of the portion of the HAP 10 with which they are coupled and maintain the aerodynamic benefits of the shape of the body 100. As mentioned, in some embodiments, the solar energy system 150 or portions thereof may be coupled with, e.g. directly attached to, the duct wall 250. For instance, some or all of the solar panels 155 may be attached to the exterior of the duct wall 250, and the body 100 may have transparent portions to allow light to reach the panels 155.

FIG. 3 is a detail view of the area 3, as taken from and shown in FIG. 2, showing a detail of a portion of the duct 200 that includes the intermediate region 230. The intermediate region 230 is a region of the duct 200 located between the forward portion 240 and the rearward portion 250 of the duct 200. The intermediate region 230 may include a portion of the duct 200 where the cross-sectional area of the duct 200 is smallest. The location of the smallest cross-sectional area of the duct 200 may be located at the third station S3. The intermediate region 230 may have a portion or portions that have converging cross-sectional areas and/or a portion or portions that have diverging cross-sectional areas, as described herein. However, the cross-sectional areas within the intermediate region 230 may have a variety of configurations, and are not limited to either diverging or converging. For example, the cross-sectional areas may be converging, constant, diverging, continuous, uniform, non-uniform, or combinations thereof, as described herein.

As shown, the intermediate region 230 may be bounded on a forward 30 end by a forward boundary 232. The intermediate region 230 may be bounded on a rearward 40 end by a rearward boundary 234. The forward and rearward boundaries 232, 234 may be geometric boundaries used to describe the bounds of the intermediate region 230. The intermediate region 230 may therefore be bounded on the ends by the forward boundary 232 and the rearward boundary 234, and bounded along the sides by the duct wall 205.

The locations of the forward and rearward boundaries 232, 234 may be defined with reference to the third station S3. As shown, the forward boundary 232 may be located in a forward 30 direction relative to the third station S3 at a distance R1. The rearward boundary 234 may be located in a rearward 40 direction relative to the third station S3 at a distance R2. R1 may be equal to R2. In some embodiments, R1 is about 10% of L. In some embodiments, R2 is about 10% of L. In some embodiments, R1 may not be equal to R2. In some embodiments, R1 may be greater than R2. In some embodiments, R2 may be greater than R1.

The intermediate region 230 may include one or more portions. In some embodiments, the intermediate region 230 may include a forward portion 236 and/or a rearward portion 237. The forward portion 236 may be bounded on a forward 30 end by the forward boundary 232. The rearward portion 237 may be bounded on a rearward 40 end by the rearward boundary 234. The forward and rearward portions 236, 237 may border each other, for example at the station S3.

The propeller 400 may be located at various longitudinal locations within the duct 200. The propeller 400 may be located within or near the intermediate region 230 of the duct. As shown, the propeller 400 may be located at the third station S3. In some embodiments, a portion of the propeller 400 may be located in the forward portion 236 and a portion of the propeller 400 may be located in the rearward portion 237. In some embodiments, the propeller 400 may be located entirely or mostly in the forward portion 236. In some embodiments, the propeller 400 may be located at the forward boundary 232. In some embodiments, the propeller 400 may be located partially or entirely forward 30 of the forward boundary 232. In some embodiments, the propeller 400 may be located entirely or mostly in the rearward portion 237. In some embodiments, the propeller 400 may be located at the rearward boundary 234. In some embodiments, the propeller 400 may be located partially or entirely rearward 40 of the rearward boundary 234.

The location of the propeller 400 may be described relative to other features of the HAP 10. In some embodiments, the propeller 400 may be located at a distance of about 10% or less of the length of the duct 200 from the forward portion 236 of the intermediate region 230, in either the forward 30 or rearward 40 direction. In some embodiments, the propeller 400 may be located at a distance of about 10% or less of the length L of the body 100 from the forward portion 236 of the intermediate region 230, in either the forward 30 or rearward 40 direction. In some embodiments, the propeller 400 may be located at a distance of about 10% of the distance from the front 102 to the rear 104 of the body 100.

Figure 4:
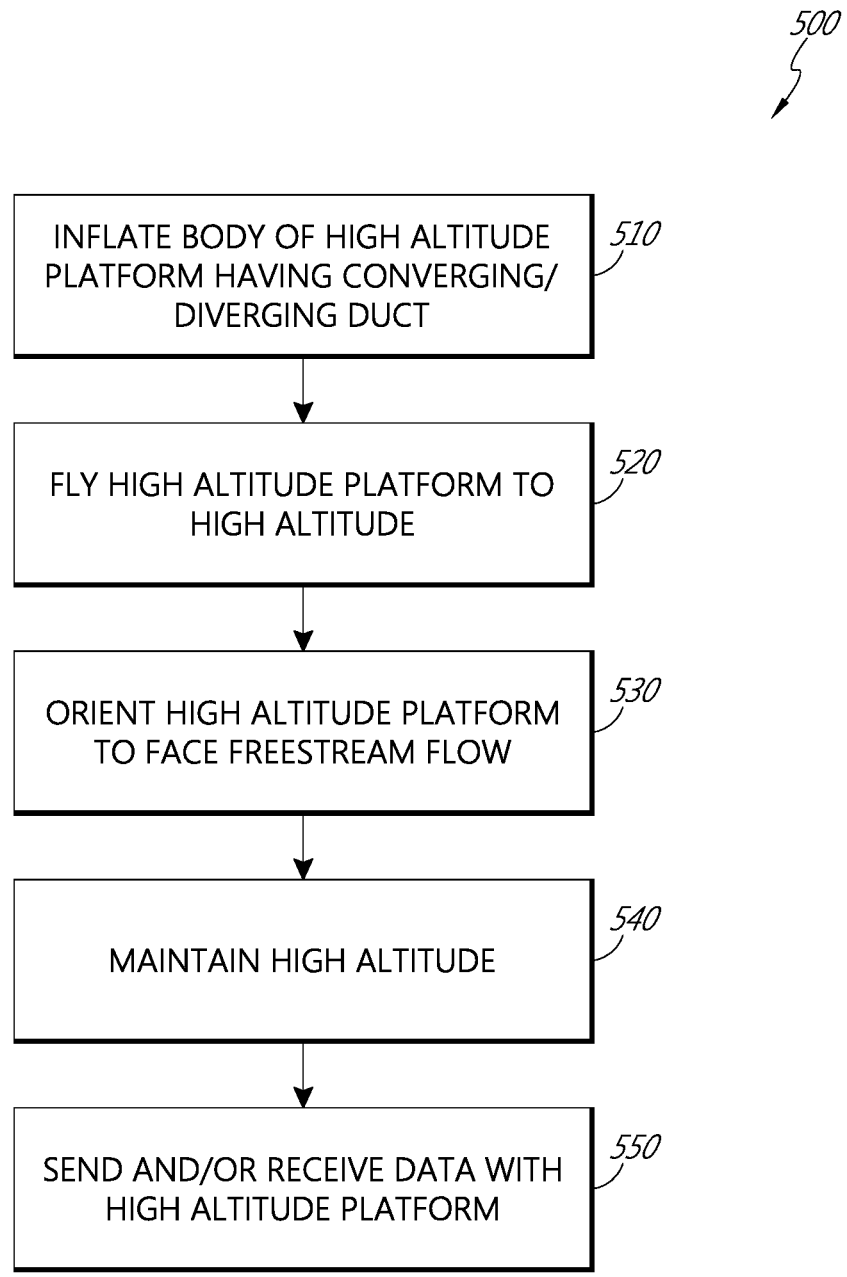
FIG. 4 is a flowchart of an embodiment of a method for providing sustained high-altitude flight with a lighter-than-air craft.

FIG. 4 is a flowchart of an embodiment of a method 500 for providing sustained high-altitude flight with a lighter-than-air high altitude platform having an opening through the platform. The method 500 may be performed by or with the HAP 10 having the duct 200. In some embodiments, an operator such as a pilot may control and fly a lighter-than-air high altitude platform according to the method 500. In some embodiments, a lighter-than-air high altitude platform may autonomously control and fly itself according to the method 500. In some embodiments, a lighter-than-air high altitude platform may be controlled and flown according to the method 500 with a combination of user-operated and autonomous controls.

The method 500 begins with step 510 wherein a body of the lighter-than-air high altitude platform having a duct therethrough is inflated. The platform may be inflated on the ground, on a ship, inside another flying craft, etc. The lighter-than-air high altitude platform may be inflated with a lighter-than-air gas to provide lift to the platform. In some embodiments, the body 100 of the HAP 10 having the duct 200 is inflated. The duct 200 of the body 100 may be the "converging and diverging" duct, as described herein. In some embodiments, the body 100 is inflated with the gas 130 to provide lift to the HAP 10. In some embodiments, the body 100 is inflated with the gas 130 to provide lift to the HAP 10 with an amount of gas sufficient to lift the HAP 10 to a minimum altitude of 50,000 feet. In some embodiments, the body 100 is inflated with the gas 130 to provide lift to the HAP 10 with an amount of gas sufficient to lift the HAP 10 to altitude of 50,000 feet, 55,000 feet, 60,000 feet, 65,000 feet, 70,000 feet, 75,000 feet, 80,000 feet, or any other lower, intermediate or greater altitude.

In some embodiments of step 510, the lighter-than-air high altitude platform is inflated to a particular pressure. In some embodiments of step 510, the body 100 and/or other features of the HAP 10 are inflated to a particular pressure. The lighter-than-air high altitude platform may be inflated to a pressure that is less than ambient atmospheric pressure at the launch site but greater than ambient atmospheric pressure at higher altitudes. For example, the lighter-than-air high altitude platform may be inflated to a pressure that is less than ambient atmospheric pressure at the launch site but greater than ambient atmospheric pressure at 50,000 feet, 55,000 feet, 60,000 feet, 65,000 feet, 70,000 feet, 75,000 feet, 80,000 feet, or any other lower, intermediate or greater altitude. The lighter-than-air high altitude platform may be "under-inflated," "sub-pressurized," and the like, as described herein, at the launch site. The lighter-than-air high altitude platform may be described as "over-inflated," "super-pressurized," and the like, as described herein, at higher altitudes.

The method 500 may continue to step 520 wherein the lighter-than-air high altitude platform is flown to a high altitude. In some embodiments of step 520, the HAP 10 is flown to a high altitude. In some embodiments, the lighter-than-air high altitude platform in step 520 is flown by a user operator, such as a remote pilot. In some embodiments, the lighter-than-air high altitude platform in step 520 flies autonomously. In some embodiments, the lighter-than-air high altitude platform in step 520 is flown to a high altitude partially by a user operator and partially autonomously. "High altitude" here refers to altitudes generally above 50,000 feet. However, this is only an approximate description, and other altitudes may be included in "high altitude" as well, such as 40,000 feet, 30,000 feet, or other lower, intermediate and greater altitudes.

In some embodiments of step 520, the lighter-than-air high altitude platform may change shape as it flies to a high altitude. In some embodiments of step 520, the body 100 of the HAP 10 changes shape as it flies to a high altitude. For example, the lighter-than-air high altitude platform may be under-pressurized at launch such that the body has a first shape. Then, as the lighter-than-air high altitude platform climbs in altitude, the shape of the body may change to a second shape that is different from the first shape as the ambient atmospheric pressure decreases. The lighter-than-air high altitude platform may have a number of different shapes as it climbs in altitude. The lighter-than-air high altitude platform may have a final shape after it reaches a final altitude for station keeping.

In some embodiments of step 520, the lighter-than-air high altitude platform may be flown to a high altitude passively. For example, the mass of gas used to provide lift may be sufficient such that the platform is positively buoyant as it flies to the high altitude. By "positively buoyant" it is meant that the upward forces acting on the platform are greater than the downward forces acting on the platform. The downward forces may include forces due to gravity acting on the mass of the platform. The upward forces may include the buoyancy forces of the atmosphere acting on the platform.

The method 500 may continue to step 530 wherein the lighter-than-air high altitude platform is oriented to face a freestream flow. In some embodiments, the HAP 10 may be oriented to face the freestream flow 70. In some embodiments, the front 102 of the body 100 of the HAP 10 may be oriented to face the freestream flow 70. In some embodiments, the first opening 210 of the HAP 10 may be oriented to face the freestream flow 70. The lighter-than-air high altitude platform may be oriented with one or more control surfaces, such as one or more of the control surfaces 500. The lighter-than-air high altitude platform may be oriented to face a freestream flow as the platform flies. The lighter-than-air high altitude platform may be oriented to face a freestream flow as the platform remains stationary, for example at its final station keeping destination.

The method 500 may continue to step 540 wherein a high altitude or a range of high altitudes of the lighter-than-air high altitude platform is maintained. In some embodiments of step 540, a high altitude of the HAP 10 is maintained. The lighter-than-air high altitude platform may be maintained at altitudes between 50,000 and 80,000 feet, or any other lower, intermediate or higher altitude. In some embodiments of step 540, a high altitude of the lighter-than-air high altitude platform is maintained with the platform facing the freestream flow. For example, in step 540 the HAP 10 may be maintained at a high altitude with the front 102 of the body 100 facing the free stream flow 70, as described herein.

In some embodiments of step 540, the lighter-than-air high altitude platform may be maintained at a high altitude passively. For example, the mass of gas used to provide lift may be sufficient such that the platform is neutrally buoyant at the high altitude. By "neutrally buoyant" it is meant that the downward and upward forces acting on the platform, as described above, are equal.

In some embodiments of step 540, the lighter-than-air high altitude platform may be maintained at a high altitude or altitudes for prolonged periods of time. For example, the lighter-than-air high altitude platform may be maintained at a high altitude for 30 days, for 45 days, for 60 days, for 90 days, for 120 days, for 180 days, or any lower, intermediate or greater amount of time.

In some embodiments of step 540, the lighter-than-air high altitude platform may receive a portion of a freestream flow through an opening extending through the length of the platform. For example, the HAP 10 may receive a portion of the freestream flow 70 through the duct 200. In some embodiments of step 540, the lighter-than-air high altitude platform may experience less drag as compared to a comparable craft, as described herein. In some embodiments of step 540, a lighter-than-air high altitude platform having a surface area coefficient of drag of about 0.002 in a twenty meters per second (m/s) flow having a Reynolds Number of about $5 \times 10^6$ may be maintained at a high altitude.

The method 500 may continue to step 550 wherein data is sent and/or received to/from the lighter-than-air high altitude platform. In some embodiments, the data is sent and/or received to/from the HAP 10. For example, one or more systems or devices of the bus 300 may be used to send and/or receive data in step 550. In some embodiments, the controller 330 and/or payload 340 may send and/or receive data in step 550. The lighter-than-air high altitude platform in step 550 may send and/or receive data to/from various senders/receivers, such as those in space, in the air, on the ground, etc. For example, the HAP 10 may communicate with a satellite, another aerial vehicle, a ground control center, etc.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described. For example, the HAP 10 may be recovered after the method 500 is performed. Such recoveries may be done in a variety of suitable manners known in the art.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A high altitude platform comprising:
   an inflatable body configured to contain a gas therein in an amount effective to provide lift such that the platform can reach a minimum altitude of 50,000 feet, wherein the body when inflated has a front with a first opening and a rear with a second opening at opposite ends of the body, wherein the distance from the front to the rear defines an inflated body length, and wherein the inflated body length is greater than a maximum width of the inflated body;
   a duct disposed through the body and having a plurality of cross-sectional areas, the duct having a length extending at least from or near the first opening at the front of the body to or near the second opening at the rear of the body, wherein the plurality of cross-sectional areas decreases from the first opening to a forward portion of an intermediate region of the duct, wherein the intermediate region is located closer to the first opening than to the second opening, and wherein the plurality of cross-sectional areas increases from a rearward portion of the intermediate region to the second opening; and
   a first propeller positioned in the duct between the first and second openings,
   wherein the body when inflated has a surface area drag coefficient of about 0.002 in a freestream flow having a speed relative to the body of twenty meters per second (m/s) and has a Reynolds Number of about $4.8 \times 10^6$.

2. The high altitude platform of claim 1, wherein the high altitude platform has a lifting capability of at least about 410 kg.

3. The high altitude platform of claim 1, further comprising a solar panel coupled with the platform and configured in conjunction with an electrical energy store to provide electrical power to the platform.

4. The high altitude platform of claim 1, further comprising a control surface configured to orient the platform such that the front faces a freestream flow.

5. The high altitude platform of claim 1, further comprising a payload coupled with the platform, the payload comprising a communication system.

6. The high altitude platform of claim 1, wherein the first propeller is positioned in the duct between the first and second openings at a position that is located at a distance of about 10% or less of the length of the duct from the forward portion of the intermediate region.

7. The high altitude platform of claim 1, wherein a divergence angle of the duct from the intermediate region to the second opening is at least about 1.3 degrees.

8. The high altitude platform of claim 1, further comprising a payload coupled with the platform, the payload comprising a surveillance system.

9. The high altitude platform of claim 1, further comprising one or more additional propellers located in the duct near the first propeller, wherein the first propeller and the one or more additional propellers are configured such that the total angular momentum of the first propeller and the one or more additional propellers when operating generates a net torque on the platform that is within a control range of a control system of the platform.

10. The high altitude platform of claim 1, wherein the body is formed of a thin-walled structure having an average thickness of less than about 0.1 inches.

11. A high altitude platform comprising:
- an inflatable body configured to contain a gas therein in an amount effective to provide lift such that the platform can reach a minimum altitude of 50,000 feet, wherein the body when inflated has a front with a first opening and a rear with a second opening at opposite ends of the body, wherein the distance from the front to the rear defines an inflated body length, and wherein the inflated body length is greater than a maximum width of the inflated body;
- a duct disposed through the body and having a plurality of cross-sectional areas, the duct having a length extending at least from or near the first opening at the front of the body to or near the second opening at the rear of the body, wherein the plurality of cross-sectional areas decreases from the first opening to a forward portion of an intermediate region of the duct, wherein the intermediate region is located closer to the first opening than to the second opening, and wherein the plurality of cross-sectional areas increases from a rearward portion of the intermediate region to the second opening; and
- a first propeller positioned in the duct between the first and second openings,
- wherein a drag force on the high altitude platform is less than 14 pounds (lbs) at an altitude of 65,000 feet in a freestream flow having a speed relative to the body of twenty meters per second (m/s).

12. The high altitude platform of claim 11, wherein the high altitude platform has a lifting capability of at least about 410 kg.

13. The high altitude platform of claim 11, further comprising a solar panel coupled with the platform and configured in conjunction with an electrical energy store to provide electrical power to the platform.

14. The high altitude platform of claim 11, further comprising a control surface configured to orient the platform such that the front faces a freestream flow.

15. The high altitude platform of claim 11, further comprising a payload coupled with the platform, the payload comprising a communication system.

16. The high altitude platform of claim 11, wherein the first propeller is positioned in the duct between the first and second openings at a position that is located at a distance of about 10% or less of the length of the duct from the forward portion of the intermediate region.

17. The high altitude platform of claim 11, wherein a divergence angle of the duct from the intermediate region to the second opening is at least about 1.3 degrees.

18. The high altitude platform of claim 11, further comprising a payload coupled with the platform, the payload comprising a surveillance system.

19. The high altitude platform of claim 11, further comprising one or more additional propellers located in the duct near the first propeller, wherein the first propeller and the one or more additional propellers are configured such that the total angular momentum of the first propeller and the one or more additional propellers when operating generates a net torque on the platform that is within a control range of a control system of the platform.

20. The high altitude platform of claim 11, wherein the body is formed of a thin-walled structure having an average thickness of less than about 0.1 inches.

* * * * *